Sept. 29, 1964  C. C. BARBER  3,150,451
TESTING OF GEAR WHEELS
Filed Aug. 25, 1960  4 Sheets-Sheet 2

Inventor
By
Attorney

Sept. 29, 1964  C. C. BARBER  3,150,451
TESTING OF GEAR WHEELS
Filed Aug. 25, 1960  4 Sheets-Sheet 4

Inventor
By
Attorney

United States Patent Office 3,150,451
Patented Sept. 29, 1964

3,150,451
TESTING OF GEAR WHEELS
Clifford Charles Barber, Chingford, London, England, assignor to National Research Development Corporation, London, England
Filed Aug. 25, 1960, Ser. No. 51,857
Claims priority, application Great Britain Sept. 4, 1959
8 Claims. (Cl. 33—179.5)

The present invention relates to improvements in or connected with the testing of gear wheels.

Heretofore a method of testing the involute formation of the flanks of gear teeth has been to roll the gearwheel along a straight edge, upon a diameter which is equal to that of the circle about which the involute tooth-form is generated and which circle is known as the "base circle." During this rolling action, a feeler or stylus is maintained in contact with a selected gear tooth flank, this feeler or stylus being associated with a dial gauge or other suitable means for indicating movement of the feeler or stylus and the arrangement being such that, if the form of this flank is perfect, then no movement will be observable on the gauge. It is usually necessary to fix the gear wheel upon a disc the diameter of which is equal to that of the base circle, so that the edge of this disc will roll along the straight edge. The disc will hereinafter be referred to as the "base disc."

The method of testing an involute gear wheel according to the present invention comprises firstly the step of making a row of substantially parallel lines, the spacing of which lines is effectively in accordance with the base circle pitch of the teeth. The second step comprises rolling the gear wheel upon its base circle disc along a path parallel to the row of lines, to test the involute accuracy of a tooth face with reference to a point upon one of the said lines. The third step comprises continuing the rolling movement of the gear wheel to bring the corresponding face of a further tooth into a position where it will be similarly tested with reference to a point upon a further line in the said row, but this time, by virtue of the spacing between the said lines, the testing of this second tooth face will not only be for involute accuracy but positionally with respect to the tooth face just tested. The fourth and succeeding steps comprise continuing the said rolling movement successively to test the other corresponding tooth faces similarly for involute and positional accuracy with reference to points upon further individual lines of the said row.

Apparatus for carrying out the method just described may comprise an improved form of involute gear testing arrangement of the kind having a member presenting a flat surface, means for rolling the gear wheel upon its base circle disc along this surface, and a carriage capable of moving along a path parallel to the said surface and carrying a stylus adapted to contact the tooth face during the said rolling movement, whereby, when the gear tooth face is correct, no movement will be transmitted to the stylus. In accordance with the invention, the improvement would consist in providing the apparatus with a row of lines spaced effectively at base circle pitch (i.e. to take into account the characteristics of the apparatus) and a datum. This row of lines and the datum would be arranged to move relatively one to the other, in a lengthwise sense of the said row, in accordance with the lateral movement of the stylus. Thus, if the first tooth face being examined should be correctly involute, there would be no deviation between the datum and a specific line of the said row, but, in the case of any deviation between the datum and another of these lines appropriate to a further, corresponding, tooth face during subsequent similar testing thereof, such deviation would, by virtue of the spacing between the said lines, represent involute inaccuracy and/or positional inaccuracy. The effectiveness of the said row of lines is ensured by their individual positioning being such as to take into account characteristics of the apparatus which would otherwise introduce inaccuracies into the said testing.

The expression "characteristics of the apparatus" is not only intended to mean those characteristics which are inherent in the apparatus, but other characteristics which may, for example, develop as a result of wear of the parts.

If the apparatus possessed none of the hereinbefore mentioned characteristics, the lines in the row of lines would be a precise distance apart: if, however, the carriage should, for example be mounted to move on guides introducing an error due to their having an unintended curvature such that a slight rotation would be applied to the carriage in its movement, then the space between the lines would not be precisely equal to the circumferential base pitch.

The means whereby the gear wheel can be rolled in a straight line may comprise a part presenting a surface extending lengthwise in a direction parallel to the row of lines, a longitudinally movable beam arranged in spaced parallel relationship to the said surface and means for loading this beam against the periphery of a base circle disc fixed to the gearwheel. This loading would urge the diametrically opposite edge portion of the disc against the said surface, so that, by moving the beam longitudinally, the disc could be rolled along this surface. If desired, a system of levers, gearing or other suitable means may be employed whereby the movement of the stylus may be amplified so that the row of lines may be spaced well apart to enable easy and accurate readings to be made. Alternatively the row of lines may be optically magnified for this purpose. The row of lines or an appropriate part of this, in either arrangement, may be optically projected onto a screen.

In a preferred form of the invention, the row of lines is applied to a table which carries a stylus and this table is mounted to move at least back and forth in a path parallel to the surface along which the gearwheel to be tested is rolled, the lines being arranged substantially at right angles to this path. The table is preferably provided with two or more styli, so that, in cases where it is desired to test large size gearwheels, the table will not be required to make large traverses.

Instead of the stylus or styli, as the case may be, being carried directly by the table, it or they may be operatively connected to the table by a suitable linkage or other system, whereby the table will receive a magnified movement for every movement of the stylus exploring a tooth flank, in which case, the spacing of the lines will require to be correspondingly opened out. Alternatively, an optical system may be employed whereby a magnified image of the row of lines or an appropriate part of this will be projected onto the screen, which may have upon it a suitable datum marking or be provided with an object which serves this purpose. In the case of the screen being provided with a datum object, this may be made so that its position can be adjusted. In the case where an optical system is employed, the top of the table may be of frame-like construction and carry a sheet of glass or other translucent material on which the row of lines is marked, a lamp being provided at one side of this translucent sheet to cause an image of the row of lines, or of an appropriate part thereof, to be projected through an objective lens disposed at the opposite side of the sheet, thence by means of a mirror or prism system, onto a ground glass screen or the equivalent of this. The screen onto which the said image is projected need not necessarily be provided with a datum marking or marker, as in many cases it may be more convenient for a pen, pencil or other removable marking to be made on it for each gearwheel tested.

As previously stated, it is in most cases necessary for the gearwheel to be tested to have fixed to its underside a base disc which will rest upon a support extending parallel to the said surface, which disc will be in rolling contact with the surface, whilst resting upon this support. The edge portion of the disc diametrically opposite to the edge portion contacting the said surface may be pressed by a spring or otherwise suitably loaded circular rod so that the said diametrically opposite edge portion is urged against the surface. The rod itself would be mounted to be capable of axial movement so that it could be manually operated to roll the base disc along the surface. In accordance with the invention, the support upon which the base disc rests is preferably in the form of a narrow strip to present a minimum of surface contact with the underside of the disc and thus reduce the possibility of error due to dirt getting between these contacting surfaces. In order to reduce the possibility of this error still further, the upper surface of the base disc supporting strip may be curved transversely.

The said surface may be presented by a body mounted upon the apparatus in such a manner that it may be adjusted lengthwise. To use the apparatus just described, adjustment is made, when necessary, by moving the stylus to bring the image of one of the lines onto the datum marking or marker or into a location where its position may be marked, as the case may be, after which the body presenting the surface can be adjusted lengthwise to bring into contact with the stylus the flank of a selected gear tooth. As the base disc is rolled, while the stylus is maintained in contact with the said flank, any displacement of the line upon the screen with respect to the datum will be a measure of error in the profile of the flank.

If rolling of the wheel is continued, and the stylus is re-positioned so as to contact the corresponding flank of a further tooth, another projected line should intersect the same point as did the first projected line, if the pitch between the two flanks successively tested is correct or an integral multiple of this, according to whether the teeth concerned are adjacent or there is or are one or more intervening teeth. In this manner all the teeth may be examined, and the deviation of lines appropriate to individual teeth from a point on the screen taken as a measure of the errors present on the gear teeth which would detract from the required uniformity of angular transmission of the gearwheel.

An example of apparatus according to the invention will now be described with reference to the accompanying drawings, of which:

Figure 2:
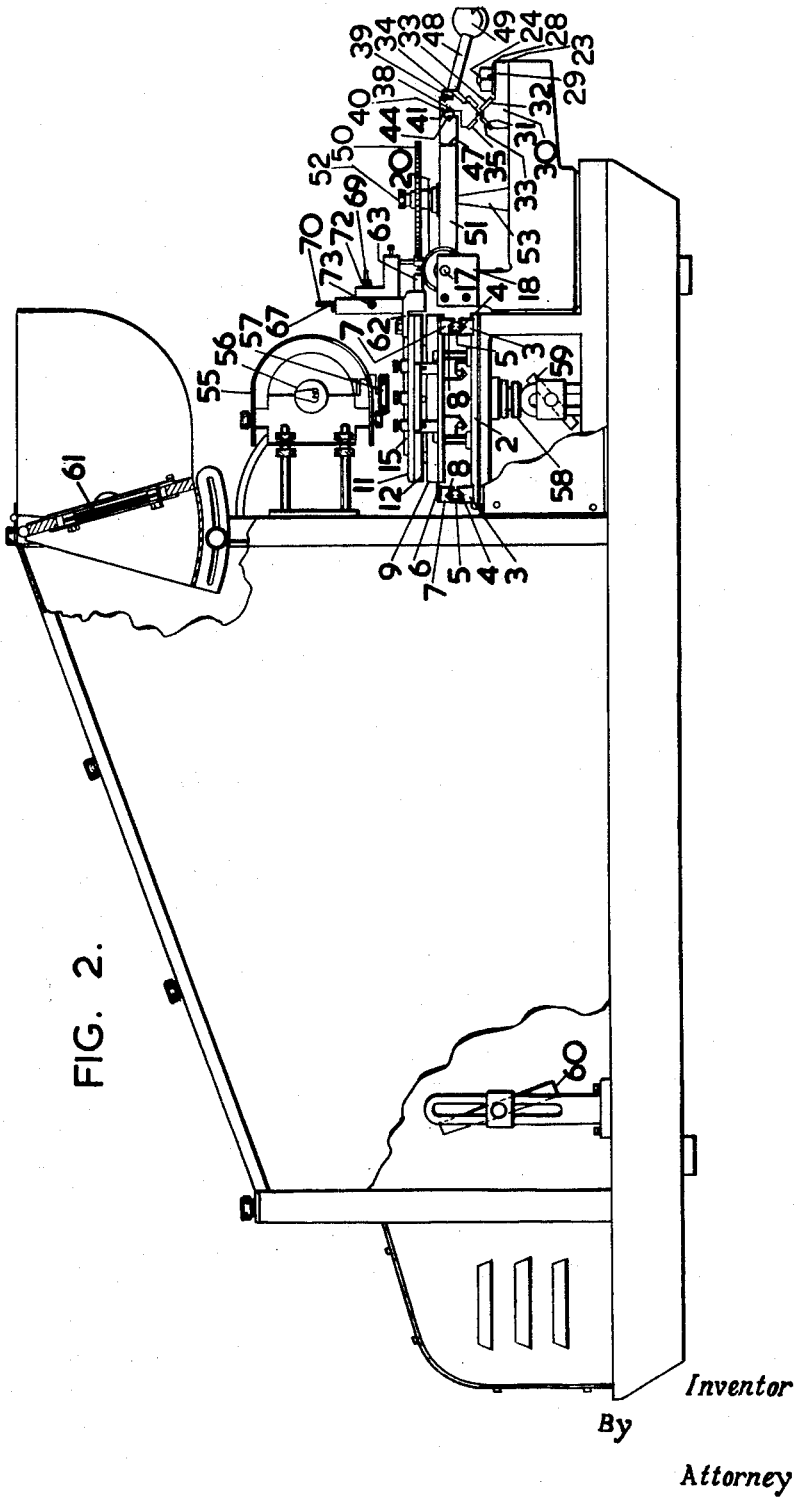
FIGURE 2 is an elevation, partly in section, of the apparatus, when viewed in the direction of the arrow II, FIG. 1.

The bed of the machine is indicated generally by 1, and on this bed is fixed a plate 2 on which are provided strips 3, 3 (FIGS. 2 and 3), each of which strips has formed along its length a V-groove 4. These strips are arranged parallel to each other and extend transversely of the machine. The V-grooves 4 have resting in them the lower portions of balls 5 (FIG. 2).

A table 6 has upon its underside strips 7, 7, arranged parallel with and one over each of the strips 3. Each of the strips 7 has along its underside a V-groove 8 resting upon the upper portions of the balls 5 associated with the adjacent strip 3, whereby the table 6 is mounted to move freely across the width of the machine. The strip 7 at the front of the machine is interrupted for some distance across the middle of the width of the machine, as will be more clearly seen upon reference to FIG. 3. A table 11 is similarly mounted upon the table 6 for movement in either direction across the machine, by means of strips 9 fixed upon the table 6 and having V-grooves 10 in which rest the lower portions of balls 5$^a$, strips 12, carried upon the underside of the table 11 and which are arranged above and parallel with the strips 9, having along their undersides V-grooves 13, which grooves sit on the upper portions of the balls 5$^a$. The balls 5 and 5$^a$ thus co-operate, respectively, with the grooved strips 3, 7, and 9, 12, to constitute low friction mountings, which permit X and Y co-ordinate movement of the table 11. Each of the said grooved strips, or parts of these, as the case may be, is provided at the opposite ends of its groove with a pin such as that indicated by 4$^a$ at the left hand end of the groove 4 in the forward strip 3, in FIGURE 3, to retain the respective balls within the groove.

Table 11 has in it a large rectangular opening 14 over which is carried a translucent plate 15.

Slidingly carried upon a ledge 16$^a$ machined along the bed of the machine is a rectangular bar 16 to one end of which is fixed a screwed spigot 17 which extends through a pair of parallel limbs of a horizontally disposed U-shaped composite member 18 built onto and secured to the machine bed by screws 19. Disposed upon the screwed spigot 17 and forming a rotatable fit between the said parallel limbs is a circular nut 20 having a knurled edge, rotation of which nut will cause axial movement of the spigot 17, to adjust the position of the slidingly mounted rectangular bar 16, the forward vertical face 21 of which bar constitutes a datum face for a purpose which will hereinafter be described. Suitable provision is made to prevent any play of the screw-thread of the spigot within the limbs of the member 18.

The forward part of the machine bed has a formed in it a channel 22 in which fits the central under portion of a slide 23, the marginal portions of which slide carry bolts 24 having rectangular heads such as 25 (FIG. 3) which slidingly engage in the transverse portions of inverted T-slots 26, 26, formed in the bed, the bodies of the bolts protruding upwardly through perforations such as 27 (FIG. 3) in the opposite side marginal portions of the plate 23 and being provided with washers 28 and nuts 29. When the nuts 29 are slackened, the slide 23 may be moved backwardly or forwardly of the bed to a required position, after which rotation of the nuts will clamp the said slide and plate in this position.

Formed along the rear of the upper part of the plate 23 is a ramp portion 30 having oppositely inclined faces 31, 32, to which are screwed clamping plates 33, between which and the faces, 31, 32, are clamped the lower end portions of oppositely inclined spring strips 34, the upper end portions of which strips are similarly clamped by clamping plates 35 screwed to appropriately inclined faces 36, 37 formed upon a substantially L-shaped member 38, along the upper face of the vertical limb of which member is formed a slot 39, and along the inner vertical face of which member is formed a V-groove 40.

Disposed inwardly of the vertical limb of the L-shaped member 38 is a horizontal beam 41 which has let into its upper surface the rear portions of strips 42 which are secured to the beam by screws 43. The forwardly projecting parts of the strips 42 extend partly over the upper surface of the vertical limb of the L-shaped member 38 and have their forward portions bent downwardly to enter the slot 39. Extending along the front vertical face of the beam 41 is a V-groove 44, between which and the V-groove 40 in the L-shaped member is a cage 45 carrying steel balls 46 (see FIG. 4), which balls protrude through the walls of the cage and track in the V-grooves 40 and 44. As will be seen in FIGS. 2, 3 and 4, the inner edge portion 47 of the beam 41 is rounded.

The strips 42 not only hold the beam 41 in position in the machine, but also permit it to be slid transversely of the machine upon the balls 46.

Secured at its rear end to a point midway along the front of the L-shaped member 38 is a forwardly projecting handle 48 having at its outer end a knob 49 which may be depressed to swing the said L-shaped member slightly upward against the action of the spring strips 34, and consequently also swing upward the beam 41.

50 indicates a gear wheel to be tested, which has been clamped co-axially upon a base disc 51 by means of a clamping bolt having a knurled head 52. The base disc has been inserted between the datum face 21 and the beam 41 while the knob 49 is depressed, the subsequent release of the knob causing the beam to move into its normal position and, under the action of the spring strips 34, press against the periphery of the base disc. By sliding the beam 41 in one or other direction, the base disc will be rolled upon the datum surface.

Fixed upon the bed of the machine and extending transversely thereof is a bar 53 of truncated triangular cross section the position of which is adjusted so that it passes diametrically across the underside of the base disc, this bar being of sufficient height to contact with the said disc and support it.

When it is desired to insert a base disc of a different diameter, the nuts 29, 29, are slacked and the slide 23 moved backward or forward by the required amount, and the nuts again tightened. Suitable provision (not shown) is made whereby the bar 53 may be freed from the bed, its position changed and the bar again fixed to the bed in the required position.

The translucent plate 15 is provided with a marking in the form of a series of equi-spaced parallel lines 54 (FIG. 3) arranged at right angles to the datum surface, this spacing being equal to the base pitch.

Above the table 11 is provided a fixed housing 55 which contains a lamp 56 (FIG. 2) and carries upon its underside a condenser 57 through which is directed light from the lamp onto the plate 15. Below the plate 15 is arranged an objective lens 58 (FIG. 2) which projects a magnified image of at least one of the lines 54 onto a mirror 59 inclined so as to reflect this image onto a mirror 60, inclined in the opposite direction in order also to reflect a final image onto a translucent screen 61.

Mounted upon the forward part of the table 11 is a pair of brackets 62, 62, each of which carries a stylus 63.

In order to test the gear wheel, the base disc is rolled along the datum surface 21 by sliding the beam 41 until an appropriae tooth face is brought into contact with one of the styli.

Figure 1:
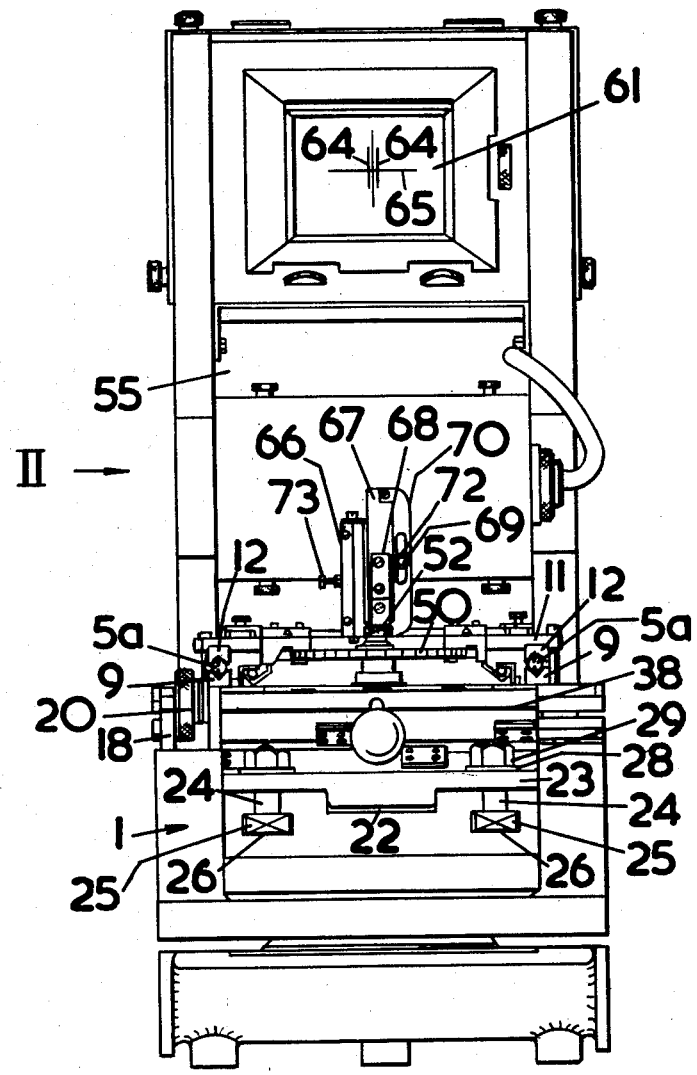
FIGURE 1 is an elevation of the apparatus.

The translucent screen 61 has marked upon it a datum point defined by two parallel vertical lines 64, 64, intersected at right angles by a horizontal line 65 (FIG. 1).

After the stylus has been brought into contact with the tooth face, the circular knurled nut 20 is rotated until a magnified image of one of the lines 54, projected from the translucent plate 15, appears midway between the two vertical lines 64, 64, of the screen 61. During further rotation of the base disc, by movement of the beam 41, whilst applying a slight bias to the table 11 to hold the stylus in contact with the tooth face, the image of the line 54 will remain in its original position between the two lines 62, 62, if the involute formation of the tooth face is correct.

Continued rolling of the base disc disengages the stylus and allows it to move to the corresponding flank of the adjacent tooth. Again, if the form of this flank is correct, the line on the screen will remain stationary during the tracking between the tooth flank and the stylus. Should any pitch error be present, the line 54 will appear displaced from the datum point. If the gear has both form and pitch errors, the line 54 will move laterally of the screen 61 and at no time pass through the datum point.

To test the opposite flanks of the teeth, the direction of rotation is reversed and the stylus biased in the opposite direction.

As this method checks flank to flank errors, it gives a true measure of the accuracy of transmission that can be expected from the gear under normal working conditions.

The bias wheel it is necessary to apply to the table 11 may be applied by suitable spring loading (not shown) the action of which can be reversible.

The provision of two styli 63 upon the machine in the manner previously described will permit the testing of large size gear wheels without the table 11 being required to make large traverses, as these styli can be used to track different parts of the gear wheel.

Figure 3:
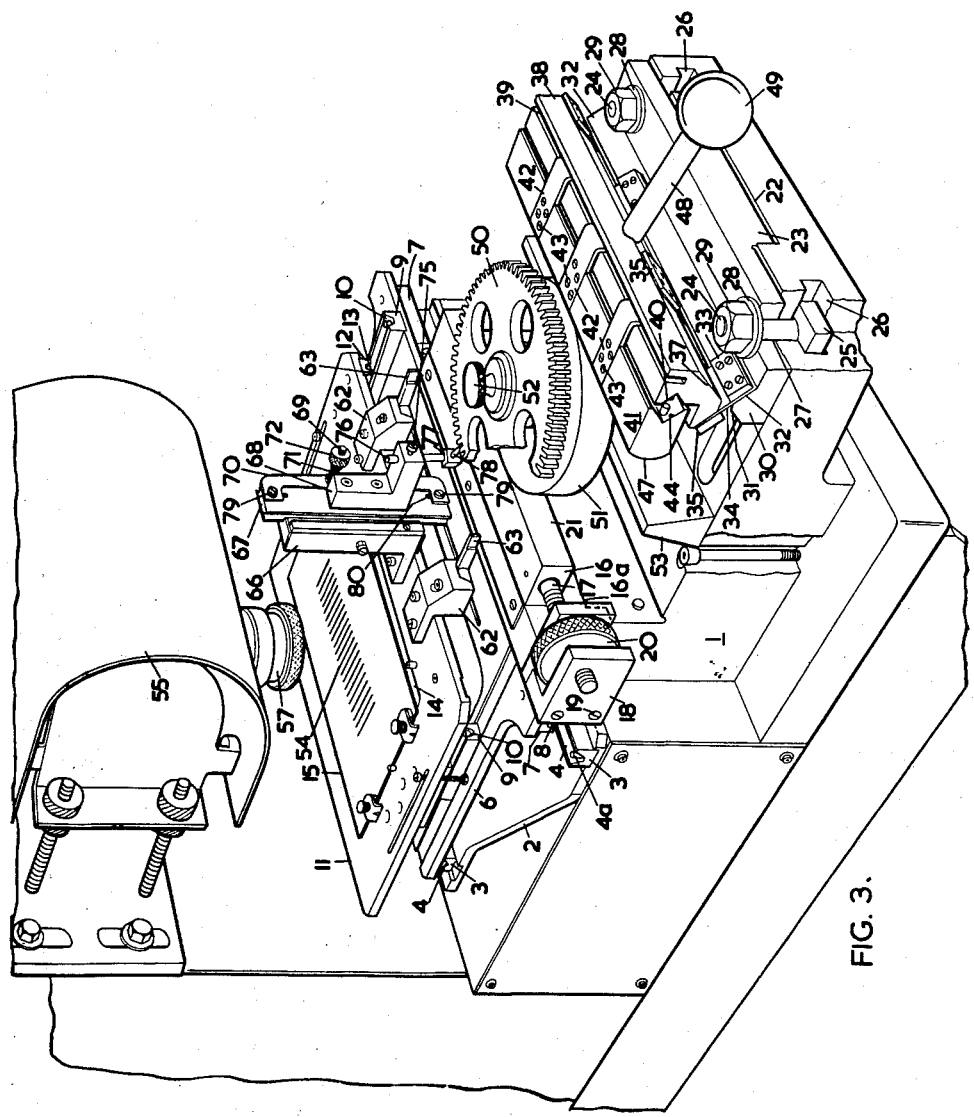
FIGURE 3 is a fragmentary perspective view, to a larger scale.
Figure 4:
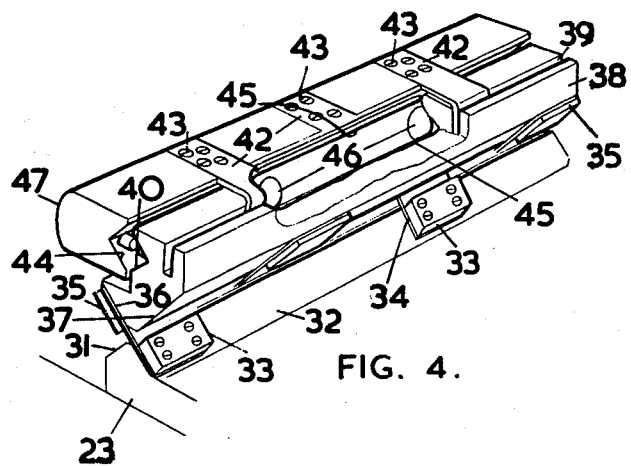
FIGURE 4 is a similar view showing certain details.

Upon reference to FIG. 3, it will be seen that the edges of the styli 63 are vertical. Should there be any "low" spots in a tooth face these would be bridged by the styli 63 and not detected.

Screwed to the middle of the forward edge portion of the table 11 is an L-shaped bracket 66, the vertical portion of which carries a slide 67 which in turn carries a bracket 68, the said bracket 66 being provided with a bolt 69 which passes through a substantially U-shaped leaf-spring 70 arranged upon the bracket 66, the parallel limbs of which leaf-spring bear on the slide 67 as a result of loading applied by a helical spring 71 surrounding the bolt 69 and in compression between the leaf-spring and a milled nut 72 upon the said bolt. The compression on the spring 71 is such that the parallel limbs of the leaf-spring 70 bear onto the slide 67 with sufficient pressure to permit this slide to be slid vertically to any required level, but to hold it frictionally in this position. In order to lock the slide 67 positively in position, should this be required, the bracket 66 is provided with a set screw 73 having a lock nut 74.

Passing through the horizontal limb of the bracket 68 and held therein by a set-screw 75, is a vertical spindle 76 having at its lower end a block 77 which carries a stylus 78 having a spherical end (not shown). By not rotating the gear wheel, and maintaining the end of the stylus in contact with a tooth flank at the pitch circle, any low spots will show up by deviation of the image of a line 54 with respect to the datum mark upon the screen. Each of the parallel limbs of the leaf-spring 70 carries a screw 79 which passes into a slot 80 in the slide 67, so as to limit the downward movement of the slide should the pressure of the leaf-spring at any time not be sufficient to prevent it from moving downward under its weight.

I claim:

1. A method of testing an involute gear wheel, comprising: firstly the step of making a row of substantially parallel lines the spacing of which is effectively in accordance with the base circle pitch of the teeth of the gear wheel, secondly, the step of rolling the gear wheel upon its base circle disc along a path parallel to the row of lines while maintaining a tooth face in contact with a feeler mounted to move parallel to the row of lines to cause relative movement lengthwise of the said row between the said row of lines and a datum, and observing any inaccuracy of the tooth face as relative lateral displacement between the datum and one of the said lines, thirdly and successively the step of continuing the rolling movement of the gear wheel and bringing the corresponding face of a further tooth into contact with the feeler and observing any relative displacement between the datum and a further line appropriate to the said further tooth face.

2. A method of testing an involute gear wheel comprising: firstly the step of making a row of substantially parallel lines upon a carriage constrained to move in a straight line parallel to the row of lines and carrying a feeler, the spacing of which lines is effectively in accordance with the base circle pitch of the teeth of the gear wheel, secondly, the step of bringing one of the lines into register with a fixed datum and bringing one of the faces of a gear tooth into contact with the feeler, thirdly, rolling the gear wheel upon its base circle along a path parallel to the row of lines while said tooth face is still in contact with the feeler, and observing any lateral displacement between the said line and datum, and, fourthly and successively, the step of continuing the rolling of the gear wheel and bringing the corresponding face of the next tooth and the feeler into contact, so that the succeeding line of the row will be observable in relation to the said datum during tracking between said succeeding tooth face and the feeler.

3. In an apparatus for testing an involute gear wheel and of the kind having a member presenting a flat surface, a base circle disc for carrying concentrically therewith the gear wheel, means for rolling the base circle disc along the said surface to rotate and translate the gear wheel, a carriage mounted for movement along a path parallel to the said surface, and a feeler upon the carriage for contacting the face of a tooth of the gear wheel during the said rolling movement, whereby when the tooth face is correct it will merely track against the feeler without displacing it, the improvement which comprises: a row of lines spaced effectively at base circle pitch of the gear to be tested, which row is arranged parallel to the path of movement of the carriage; and a datum, which row of lines and datum are relatively movable in a lengthwise sense of the said row in accordance with lateral movement of the feeler, one of said row of lines and said datum being mounted for movement with said carriage, whereby inaccuracies of the gear wheel will become apparent during said tracking as lateral displacement between the datum and a line appropriate to a particular tooth face.

4. Apparatus as claimed in claim 3, in which the said row of lines is mounted to move with the carriage upon which is carried the feeler, and the said datum is carried by a fixed part of the apparatus so as to be stationary.

5. Apparatus as claimed in claim 3, in which the datum is fixed relatively to the carriage upon which is carried the feeler, and the row of lines is carried by a fixed part of the apparatus so as to be stationary.

6. Apparatus as claimed in claim 3, comprising a screen, and optical means for projecting onto the screen, in relation to the datum, an image of the line appropriate to the tooth face in contact with the feeler.

7. Apparatus as claimed in claim 3, comprising a plurality of feelers upon the carriage, spaced apart therealong, whereby when the carriage has been moved along to enable the forward feeler to follow the translation of the gear wheel as far as the said forward feeler is capable of operating, the succeeding feeler will come into operation.

8. An apparatus for testing an involute gear wheel comprising: a member presenting a flat surface, a base circle disc for carrying concentrically the gear to be tested and having a diameter substantially equal to the base circle of the gear wheel; means for rolling the gear wheel upon its base circle disc along said flat surface; a carriage movable along a path parallel to said flat surface; a feeler coupled to the said carriage so as to displace the carriage an amount proportional to the displacement of the feeler and in a direction controlled by the displacement of the feeler, said feeler being so positioned as to contact a flank face of a tooth of the gear to be tested as the gear is rolled with its base circle; a row of lines spaced substantially at base circle pitch of the gear to be tested, said lines being located on said carriage and each being substantially perpendicular to said flat surface; a fixed datum; whereby when said stylus traces across the face of a first tooth flank, any inaccuracy in the involute form of said tooth face is evidenced by a relative movement between at least one of said lines and said datum, and when said stylus is positioned to trace across the face of a second tooth during subsequent rolling movement of the gear to be tested and its base circle disc any relative movement between the datum and at least one other of the lines is indicative of involute and/or positional inaccuracy; said lines each being so spaced as to compensate for any inaccuracies in the machine which would otherwise introduce inaccuracies into the testing.

References Cited in the file of this patent
UNITED STATES PATENTS

| | | |
|---|---|---|
| 2,026,649 | Olson | Jan. 7, 1936 |
| 2,542,755 | Dietrich | Feb. 20, 1951 |
| 2,895,227 | Wagner | July 21, 1959 |